United States Patent
Rayanki et al.

(10) Patent No.: US 9,456,331 B2
(45) Date of Patent: Sep. 27, 2016

(54) METHODS OF DISCOVERING DEVICES FOR NETWORK FORMATION

(71) Applicant: Google Technology Holdings LLC, Mountain View, CA (US)

(72) Inventors: Sreenivasulu Rayanki, Cupertino, CA (US); Himanshu R. Lokre, Chicago, IL (US); Yuangliang Lu, Glenview, IL (US); Nitya K. Reddy, Waukegan, IL (US); Sudhir C Vissa, Lake Bluff, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/465,997

(22) Filed: Aug. 22, 2014

(65) Prior Publication Data

US 2016/0057602 A1    Feb. 25, 2016

(51) Int. Cl.
*H04L 12/28*    (2006.01)
*H04W 8/00*    (2009.01)
*H04W 76/02*    (2009.01)
*H04W 84/12*    (2009.01)

(52) U.S. Cl.
CPC .......... *H04W 8/005* (2013.01); *H04W 76/021* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,126,399 B1 | 2/2012 | Lee | |
| 8,295,766 B2 | 10/2012 | Zimbric et al. | |
| 2010/0190440 A1 | 7/2010 | Kim | |
| 2012/0079019 A1* | 3/2012 | Miettinen | G06Q 50/00 709/204 |
| 2012/0137346 A1* | 5/2012 | Lee et al. | 726/4 |
| 2013/0185373 A1* | 7/2013 | Vandwalle | H04W 56/0015 709/208 |
| 2014/0075011 A1 | 3/2014 | Salkintzis | |
| 2014/0092885 A1* | 4/2014 | Venkatachalam et al. | 370/338 |
| 2014/0136318 A1 | 5/2014 | Alberth, Jr. et al. | |
| 2014/0160978 A1* | 6/2014 | Palin et al. | 370/254 |

* cited by examiner

*Primary Examiner* — Edan Orgad
*Assistant Examiner* — Rebecca Song
(74) *Attorney, Agent, or Firm* — Faegre Baker Daniels LLP

(57) ABSTRACT

Disclosed are methods and systems for broadcasting and scanning for a service simultaneously. The present disclosure provides a solution for devices utilizing Bluetooth and Wi-Fi.

18 Claims, 5 Drawing Sheets

METHODS OF DISCOVERING DEVICES FOR NETWORK FORMATION

TECHNICAL FIELD

The present disclosure is related generally to connecting devices in a peer-to-peer network, more particularly, to providing methods for performing service discovery and connectivity for devices that do not support Wi-Fi Direct and currently available Service Discovery protocols.

BACKGROUND

Consumers can use a wide array of devices to exchange data with each other. Some devices are mobile (e.g. mobile phones, personal digital assistants, portable media players, etc.) while others are fixed (personal computers, media servers, etc.). Some devices communicate via land lines while others communicate primarily through wireless technology, such as Wi-Fi networks. To exchange data, however, these devices must have some means of setting up and managing communication links with other devices.

Conventional Wi-Fi networks are typically based on the presence of controller devices known as wireless access points. These devices normally combine three primary functions; physical support for wireless and wired networking, bridging and routing between devices on the network, and service provisioning to add and remove devices from the network.

A typical Wi-Fi home network includes laptops, tablets and phones, devices like modern printers, music devices and televisions. The majority of Wi-Fi networks are set up in "infrastructure mode", where the access point acts as a central hub to which Wi-Fi capable devices are connected. The devices do not communicate directly with each other (that is, in "ad-hoc mode"), but they go through the access point. Wi-Fi Direct devices are able to communicate with each other without requiring a dedicated wireless access point. The Wi-Fi Direct devices negotiate when they first connect to determine which device shall act as an access point.

As the number and type of devices attaching to Wi-Fi systems increased, the basic model of a simple router with smart computers became increasingly strained. At the same time, the increasing sophistication of the hot spots presented setup problems for the users. To address these problems, there have been numerous attempts to simplify certain aspects of the setup task.

Accordingly, developers have created a number of network protocols to help manage connections between devices. Examples include, but are not limited to, Universal Plug and Play (UPnP) and Bonjour. A network protocol typically includes different a set of rules by which devices advertise themselves and their capabilities, discover other devices and their capabilities, establish connections with other devices, and manage these connections. For example, UPnP includes a discovery phase during which a device entering a network can advertise its presence to other devices. UPnP also includes a description phase during which devices learn about each other's capabilities (also called "services"). Other protocols include similar phases, although they may be referred to by different terminology.

While Wi-Fi Direct and service discovery have made connecting to devices and forming networks more automated, devices that do not support such protocols have been left with limited options.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
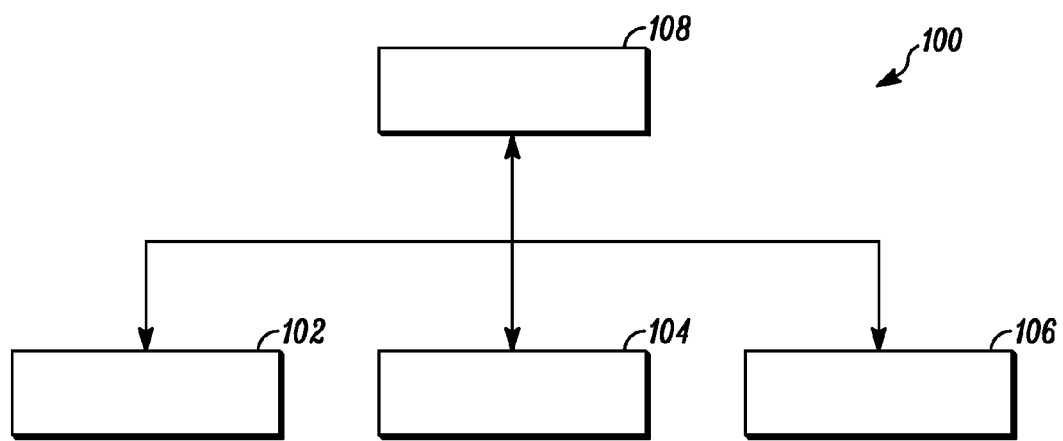
FIG. 1 is a block diagram illustrating a Wi-Fi peer-to-peer communication network in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As provided above, devices that do not support Wi-Fi Direct with service discovery (e.g., Bonjour or UPnP) currently have limited options for broadcasting and scanning for a service simultaneously. The present disclosure provides a solution for such devices utilizing Bluetooth, a wireless personal area network (WPAN), and Wi-Fi.

Apparatus for implementing any of the below described arrangements, and performing any of the below described method steps, may be provided by configuring or adapting any suitable apparatus, for example one or more computers or other processing apparatus or processors, and/or providing additional modules. The apparatus may include a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the Figures, FIG. 1 is a block diagram illustrating a Wi-Fi peer-to-peer communication network or system 100 in which the present techniques may be practiced. This example system 100 includes a plurality of client or peer devices 102, 104, 106, 108. As shown, client device 108 is serving the role of group owner or host. In other embodiments, the present disclosure may be implemented in a different system that may comprise a different number of client devices. The number of client device can be, for example, at least two, at least three, at least five, at least ten, at least twenty, or at least fifty. Also, the present disclosure may be implemented in a different system that may include one or more appropriate different types of devices instead of or in addition to any or all of those devices in the system 100 shown in FIG. 1.

In FIG. 1, system 100 represents an unmanaged network in which the peer-to-peer client devices communicate with each other directly without requiring a centralized control point. This direct communication enables increased functionality in the network. As shown, client device 108 communicates with the client devices 102, 104, 106 without requiring access points.

The terminology "client device" or "peer device" is used herein to refer to a personal or mobile computing device. Thus, each of the client devices 102, 104, 106, 108 may be, for example, a smartphone, a wireless phone, a desktop personal user device, a laptop user device, a tablet user device, a mobile station, an entertainment appliance, a netbook, camera, a television, a game console, a wearable device, etc.

Client devices 102, 104, 106, 108 are configured to communicate via wireless protocols such as Wi-Fi, WiMax or any other wireless standard. In some embodiments, client devices 102, 104, 106, 108 may communicate amongst each other in ad-hoc or infrastructure based networks.

It should be appreciated that each of the client devices 102, 104, 106, 108 can have a capability to act as a wireless or mobile access point, and a router, for devices connected to it (e.g. the other user devices). In some embodiments, each of the user devices 102, 104, 106, 108 has a mobile hotspot capability (as the user devices 102, 104, 106, 108 are connected together via a Wi-Fi communications link, e.g. the first communications link). In other words, each of the user devices 102, 104, 106, 108 is able to function as a mobile access point (for each of the other user devices 102, 104, 106, 108) to the Internet. In other words, each of the user devices 102, 104, 106, 108 is able to provide Internet connectivity for each of the other user devices 102, 104, 106, 108.

Figure 2:
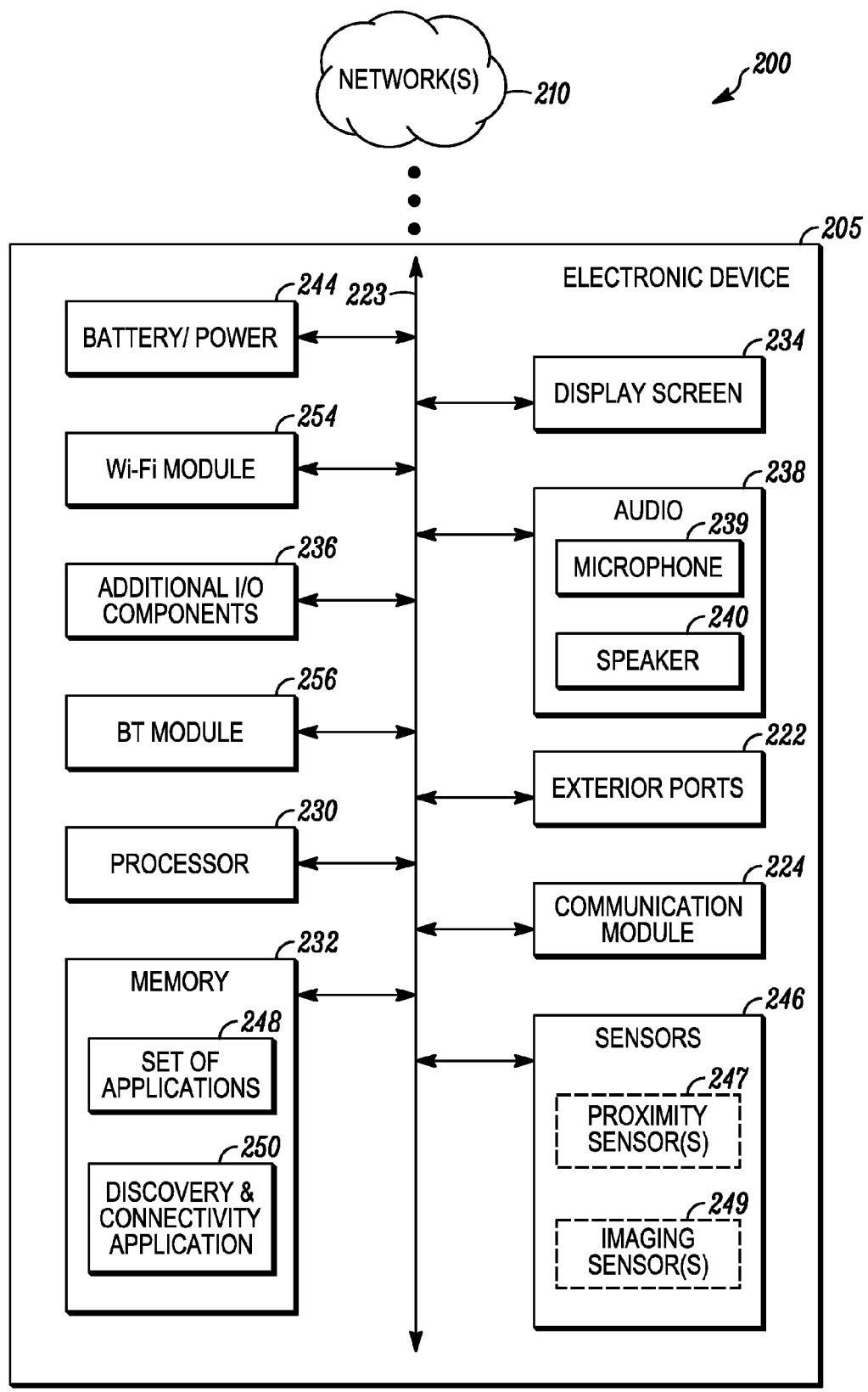
FIG. 2 is a block diagram of an example computer system in which the present techniques may be practiced.

FIG. 2 illustrates an example electronic device 205 (such as client device 102, 104, 106, 108) as discussed with respect to FIG. 1, in which the aspects may be implemented. The electronic device 205 can include a processor 230, a memory 232 (e.g., hard drives, flash memory, MicroSD cards, and others), a power module 244 (e.g., batteries, wired or wireless charging circuits, etc.), and one or more external ports 222 (e.g., cellular input and output, Universal Serial Bus (USB), HDMI, IEEE 1394, and/or others), a Wi-Fi module 254, and a Bluetooth module (i.e., a WPAN module) 256, each configured to communicate via a communication bus 223. The processor 230 can interface with the memory 232 to execute a set of applications 248 capable of facilitating the functionalities as discussed herein. As shown in FIG. 2, the memory 232 can store a Discovery and Connectivity Application 250 that functions to interact with other devices and change and search for information using a Bluetooth protocol (i.e., a WPAN protocol) and connect with other devices using a Wi-Fi protocol, for example.

In some embodiments, the Discovery and Connectivity Application 250 is in communication with Wi-Fi module 254 and Bluetooth module 256, providing instructions for how and when the modules 254, 256 perform operations. In some embodiments, Discovery and Connectivity Application 250 has a presence on the user interface of device 205, allowing a user to launch the Discovery and Connectivity Application 250 when desiring to form a peer-to-peer network.

In some embodiments, Bluetooth module 256 is configured to enable/disable Bluetooth protocol, change the Bluetooth name field (i.e., WPAN name field) of device 205, and search for neighboring Bluetooth-enabled devices. The Bluetooth module also allows a client device to be discoverable by other devices in the proximity. This is in contrast to the traditional role of using Bluetooth for pairing user devices.

Valid Bluetooth names (i.e., WPAN names) are generally 248 bytes using UTF-encoding, although many devices can only display the first 40 characters or less. It should be appreciated that the Bluetooth name field in client devices are generally configurable to provide various values, including: service name, device capability, state of service, etc. Such a Bluetooth name can include a prefix verification in order to sustain multiple groups with different Bluetooth names in one area; while discovering Bluetooth devices, the prefix may be verified to determine if a device is part of a system or application and leave it to a user to determine which group to join by displaying the different device names with the same prefix. Alternatively, or in addition, the Bluetooth name field may similarly include suffix verification.

In some embodiments, Bluetooth module 256 is used to change the Bluetooth name field to a given name. For the purposes of this disclosure, the Bluetooth name field is utilized to at least tag or identify devices with the given or assigned name. In some embodiments, a user provides the given or assigned Bluetooth name and in other embodiments, Bluetooth module 256 provides the given Bluetooth name In some embodiments, Wi-Fi module 254 is configured to enable/disable Wi-Fi protocol, determine a host device or group owner of a peer-to-peer network, and provide connectivity to other peer devices and/or the host device. In some embodiments, Wi-Fi module 254 is configured to utilize information obtained using Bluetooth protocol.

The electronic device 205 can further include a communication module 224 configured to interface with the one or more external ports 222 to communicate data via one or more networks 210. For example, the communication module 224 can include one or more transceivers functioning in accordance with IEEE standards, 3GPP standards, or other standards, and configured to receive and transmit data via the one or more external ports 222. More particularly, the communication module 224 can include one or more WWAN transceivers configured to communicate with a wide area network including one or more cell sites or base stations to communicatively connect the electronic device 205 to additional devices or components. Further, the communication module 224 can include one or more WLAN and/or WPAN transceivers configured to connect the electronic device 205 to local area networks and/or personal area networks, such as a Bluetooth® network.

The electronic device 205 can further include one or more sensors 246 such as, for example, proximity sensors 247 (e.g., NFC sensors or RFID chips), imaging sensors 249, and/or other sensors. The electronic device 205 can include an audio module 238 including hardware components such as a speaker 240 for outputting audio and a microphone 239 for receiving audio. The electronic device 205 may further include one or more display screen 234, and additional I/O components 236 (e.g., touch sensitive input, keys, buttons, lights, LEDs, cursor control devices, haptic devices, and others). The display screen 234 and the additional I/O components 236 may be considered to form portions of a user interface (e.g., portions of the electronic device 205 associated with presenting information to the user and/or receiving inputs from the user).

In embodiments, the display screen 234 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 234 can include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 230 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

As described above with reference to FIG. 1, many user devices e.g., smartphones and other mobile communications devices, provide a "mobile hotspot" capability. The mobile hotspot capability enables a user device to function as a mobile access point to the Internet (or other network) which may be used by other user devices (e.g. other mobile communications devices) to connect to the Internet (or other network).

Such mobile hotspot capabilities are supported and enabled using Wi-Fi protocols or technology for the connections. However, discovering the mobile devices to form a network is typically achieved using other protocols, such as UPnP or Bonjour. In the present disclosure, Bluetooth (e.g., via a Bluetooth module) is used to provide such discovery of mobile devices.

Figure 3:
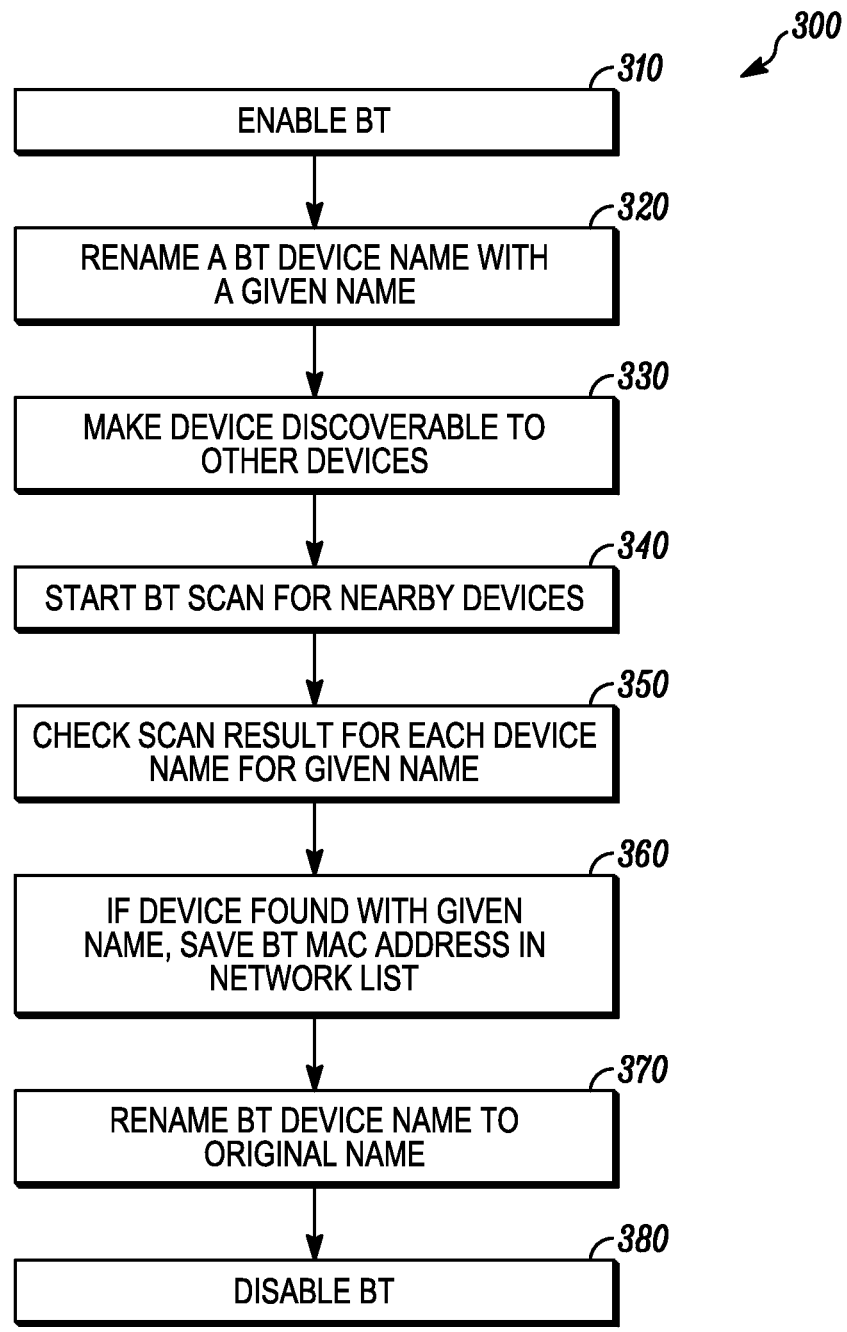
FIG. 3 is a flowchart of a representative method for discovering devices using a Bluetooth protocol.

FIG. 3 is a representative method 300 for discovering devices using a Bluetooth protocol. Method 300 begins with block 310, where Bluetooth protocol is enabled or turned on. Prior to block 310, Bluetooth is not enabled. For example, users of two or more client devices can decide to form a peer-to-peer network with each other and initiate method 300 when in close proximity to each other.

In block 320, the Bluetooth device name for each device is renamed with a given or assigned device name. As should be understood, the Bluetooth device name is used interchangeably with the Bluetooth device name field.

In some embodiments, the given device name is the same name for each device that has been renamed in the Bluetooth name field; in other words, all identified devices in proximity have been tagged or identified with the same name. For example, if a first client device employing method 300 is renamed with the given name "Minerva", then each client device in the proximity employing method 300 is also renamed "Minerva".

While not explicitly shown, a password may be provided to each renamed client device for, e.g., security purposes or in order to form a closed network. In some embodiments, the password is associated with the given device name in the Bluetooth name field. In such embodiments, this ensures that the same password is provided to renamed devices that are saved in the network list, described below.

In block 330, the devices that have been renamed with the given name are made discoverable to other devices in the proximity. The devices may be made discoverable by publishing or broadcasting the device information via Bluetooth protocol. Such published device information may include, for example, device name, media access control (MAC) address, etc. In some embodiments, the device information is published to Bluetooth-enabled devices in a range of approximately 200 meters or less; in some embodiments, in a range of approximately 100 meters or less; and in some embodiments, in a range of approximately 20 meters.

In block 340, each renamed client device starts a Bluetooth scan (i.e., a WPAN scan) for nearby devices. This scan is performed according to standard Bluetooth specification. In block 350, each renamed client device checks the scan result for each device name found in the proximity. The renamed devices are seeking, in particular, for other devices having the given name.

In some embodiments, the scan is performed at predetermined time intervals. In other embodiments, the scan is performed intermittently. In still other embodiments, the scan is performed each time a device is found. In other embodiments, the scan is performed until at least one device is found. During the scan, each renamed client device obtains each other renamed client device's Bluetooth MAC address (i.e., WPAN MAC address) or physical address.

Thereafter, in block 360, each renamed client device saves or caches the Bluetooth MAC address for any other renamed devices found. In some embodiments, the Bluetooth MAC address and corresponding device are saved in a network list resident on or available to the saving device.

In block 370, when the scanning process is finished, each renamed client device is renamed back to its original name in the Bluetooth field. The renaming of client devices back to their original name may occur via standard Bluetooth specification.

In block 380, Bluetooth protocol is disabled or turned off. The disabling of the Bluetooth protocol ensures that client devices are only found using Bluetooth and not paired to each other via Bluetooth.

It should be appreciated that, one or more of the client devices may be connected to peripheral devices before searching for other client devices. Renaming the client device with a given name in the Bluetooth name field does not interrupt communications with the client device and peripheral device.

As provided above, the Bluetooth name field is used to identify and find nearby devices (e.g., service discovery). Such service discovery includes: 1) publishing the service and 2) scanning for nearby devices with similar service. Thus, Bluetooth protocol is used in the discovery process to identify common interest parties.

Figure 4:
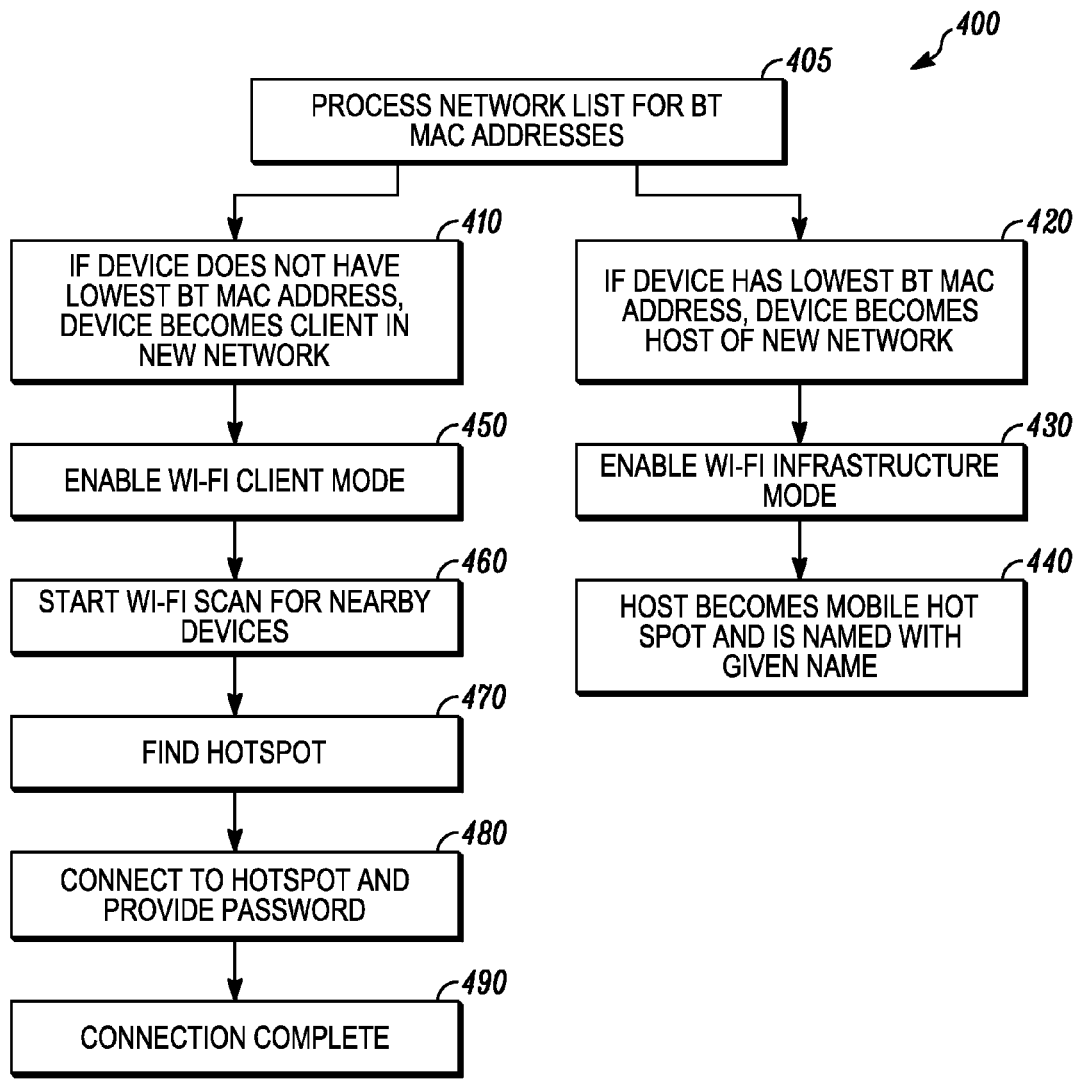
FIG. 4 is a flowchart of a representative method for connecting devices using a Wi-Fi protocol.

FIG. 4 is a flowchart of a representative method 400 for connecting devices using a Wi-Fi protocol. In block 405, a network list having Bluetooth MAC addresses is processed. Such network list may be constructed using Bluetooth discovery, such as described in FIG. 3.

In some embodiments, the processing of the network list in block 405 includes organizing the Bluetooth MAC addresses and their corresponding devices. For example, each client device may determine which client device in the network list is associated with the lowest MAC address—this should have the same result at all client devices.

In block 410, if the client device does not have the lowest MAC address, the client device assumes a client role in a new network that is to be formed using the devices in the network list.

In block 420, if the client device does have the lowest MAC address, that device assumes a host role in the new network. Thereafter, in block 430, the host device enables or turns on Wi-Fi server mode or infrastructure mode. This Wi-Fi server mode or infrastructure mode allows the host device to beacon or announce to other devices that they may connect to it.

In block 440, the host device becomes a mobile hotspot. For example, the host device may become a portable mobile hotspot to enable wireless communication among connected devices, without the need for the Internet (e.g., no need for cellular or Wi-Fi public hotspots). The host device may name the mobile hotspot is named with a given name. In some embodiments, the given name of the mobile hotspot is the same name as used temporarily in the Bluetooth name field.

In block 450, for all other devices that assume a client role in the new network, each of the client devices enable or turn on Wi-Fi client mode. The Wi-Fi client mode allows each client device to listen for the beaconing host device.

In block 460, each client device starts a Wi-Fi scan for nearby devices. The proximity of the scan is dependent on Wi-Fi specification. The Wi-Fi scan allows the client devices to search for the mobile hotspot. As such, the Wi-Fi scan may include the client devices entering a listening mode for a predetermined period of time. Additionally, because the hotspot includes the given name previously used in the Bluetooth name field, the client device can verify that it is the hotspot the client device intends to connect to.

In block 470, a client device has found the mobile hotspot. Thereafter, in block 480, the client device attempts to connect to the mobile hotspot via Wi-Fi protocol. As part of the connection, the client device provides a password previously transmitted to all devices includes included in the network list. This password helps ensure that only devices that were discovered via a Bluetooth protocol can connect to the hotspot to form the new peer-to-peer network.

In some embodiments, the password may be selected from the scan results, either Bluetooth or Wi-Fi, or include a derivation from such scan results. For example, the password may include the lowest or highest MAC address from the Bluetooth or Wi-Fi scan results, provided that the password is different than the MAC address being used to connect to the mobile hotspot. In some embodiments, the password is derived from the MAC address of the mobile hotspot. Such derivation techniques are known to those of skill in the art and may be implemented by the discovery and connectivity application 250. A benefit of derivation and/or associating the password with a MAC address is that the password is dynamic and constantly changing.

In block 490, the connection is complete, with at least one client device connecting to the hotspot. Thus, FIG. 4 illustrates that Wi-Fi may be used for: 1) resolving the role for devices and 2) organizing the network/service.

Figure 5:
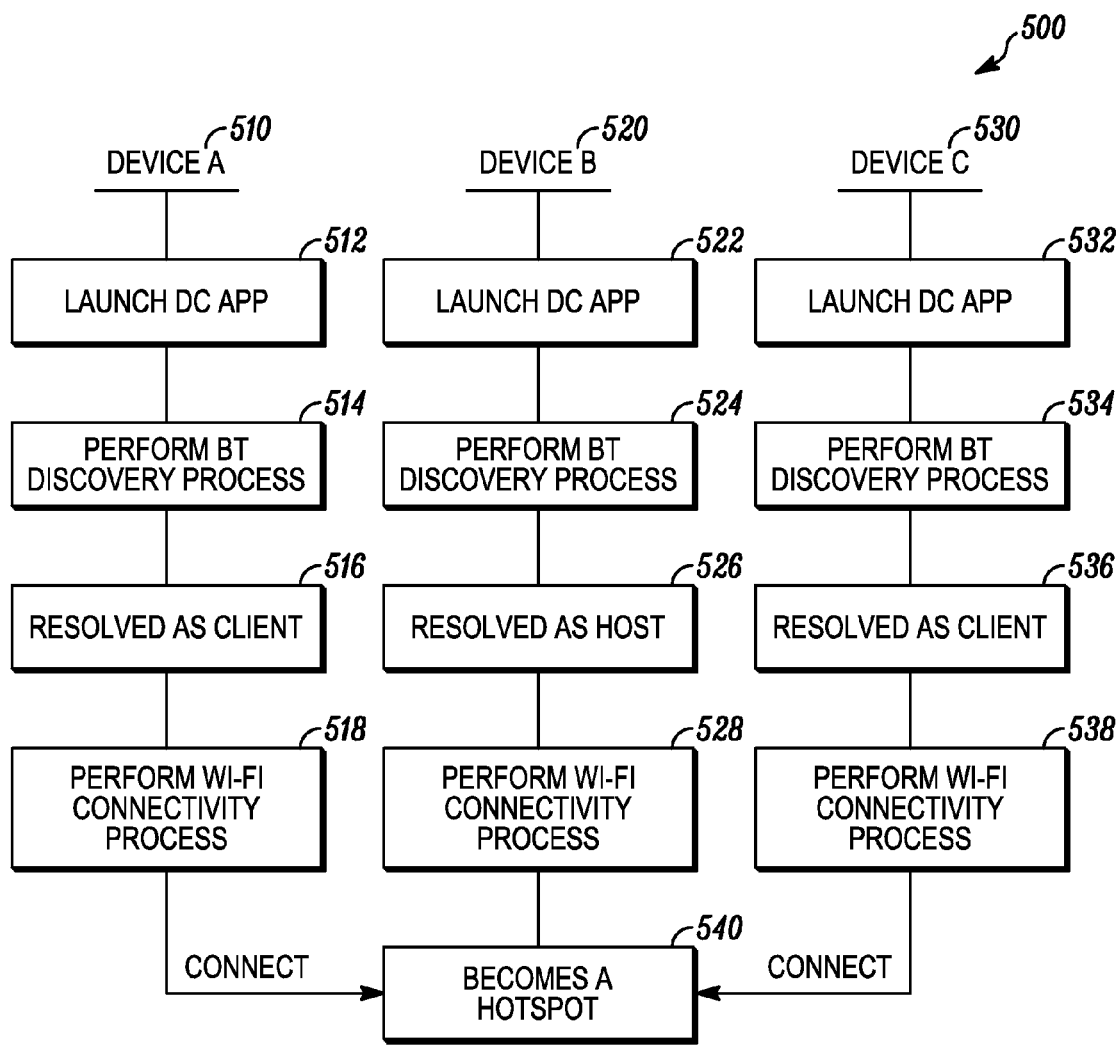
FIG. 5 is a flowchart of a representative method for multiple devices to form a network.

FIG. 5 is a flowchart of a representative method 500 for multiple devices to form a network. As shown, there are three client or peer devices—device A 510, device B 520, and device C 530. At the beginning of method 500, a network has not yet formed.

At block 512, device 510 launches or initiates the discovery and connectivity application 250 as described with respect to FIG. 2. At block 522, device 520 launches or initiates the discovery and connectivity application 250 and at block 532, device 530 launches or initiates the discovery and connectivity application 250.

At block 514, device 510 performs the Bluetooth discovery method 300 as described with respect to FIG. 3. At block 524, device 520 performs the Bluetooth discovery method 300 and at block 534, device 530 performs the Bluetooth discovery method 300.

At block 516, device 510 is resolved as a client device by determining it did not have the lowest Bluetooth MAC address in the group of devices 510, 520, 530. At block 526, device 520 is resolved as a host device by determining it did have the lowest Bluetooth MAC address in the group of devices 510, 520, 530. At block 536, device 530 is resolved as a client device by determining it did not have the lowest Bluetooth MAC address in the group of devices 510, 520, 530.

At block 518, device 510 performs a portion (blocks 410, 450, 460, 470) of the Wi-Fi connectivity method 400 as described with respect to FIG. 4. At block 528, device 520 performs a portion (blocks 420 and 430) of the Wi-Fi connectivity method 400 and at block 538, device 530 performs a portion (blocks 410, 450, 460, 470) of the Wi-Fi connectivity method 400.

At block 540, device 520 becomes a mobile hotspot (block 440 from method 400). Thereafter, device 510 and device 530 attempt to connect to the hotspot, as previously described. The resultant network is a peer-to-peer network with the client device having the lowest Bluetooth MAC address as the host device and all other devices as client devices. Such network is formed using a Bluetooth protocol for discovering the devices and Wi-Fi protocol connecting of the devices.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of discovering and connecting devices to form a network, the method comprising:

temporarily renaming a first device, by a wireless personal area network (WPAN) module executed on the first device, with a temporary device name in a WPAN name field of the first device;

making, by the WPAN module, the first device discoverable based on the temporary device name;

performing, by the WPAN module, a WPAN scan for nearby devices that have the same temporary device name;

based on the WPAN scan, finding, by the WPAN module, one or more of the nearby devices with the same temporary device name;

saving, by the WPAN module, MAC addresses of the one or more of the nearby devices found with the same temporary device name;

changing, by the WPAN module, the temporary device name in the WPAN name field of the first device to another device name; and connecting, by a Wi-Fi module executed on the first device, the first device to a second device to form the network, the second device being one of the one or more of the nearby devices found with the same temporary device name.

2. The method of claim 1, wherein the MAC addresses comprise WPAN MAC addresses.

3. The method of claim 1, wherein the MAC addresses are saved in a network list.

4. The method of claim 1, wherein the another device name is an original device name of the first device.

5. The method of claim 4, wherein the another device name and the original device name are different.

6. The method of claim 1, further comprising:
enabling, by the WPAN module, a WPAN protocol for the first device prior to making the first device discoverable.

7. The method of claim 6, further comprising:
disabling, by the WPAN module, the WPAN protocol for the first device after saving the MAC addresses of the one or more of the nearby devices found with the same temporary device name.

8. The method of claim 1, further comprising:
receiving, by the WPAN module, a password for communicating with the second device.

9. The method of claim 2, further comprising:
processing, by the Wi-Fi module executed on the first device, a network list of WPAN MAC addresses saved as a result of performing the WPAN scan;
determining, by the Wi-Fi module, a lowest WPAN MAC address in the network list;
if the first device is determined to have the lowest WPAN MAC address, enabling, by the Wi-Fi module, a Wi-Fi infrastructure mode for the first device; and
if the first device is determined to not have the lowest WPAN MAC address, enabling, by the Wi-Fi module, a Wi-Fi client mode for the first device.

10. The method of claim 9, wherein if the first device is enabled in the Wi-Fi client mode, performing, by the Wi-Fi module, a Wi-Fi scan for the second device, the second device being enabled in the Wi-Fi infrastructure mode.

11. The method of claim 10, further comprising:
based on the Wi-Fi scan, connecting, by the Wi-Fi module, to the second device enabled in the Wi-Fi infrastructure mode.

12. The method of claim 11, wherein connecting to the second device enabled in the Wi-Fi infrastructure mode comprises providing a password to connect to the second device, the password being previously received by the first device.

13. The method of claim 9, wherein if the first device is enabled in the Wi-Fi infrastructure mode, the first device comprises a mobile hotspot.

14. The method of claim 13, further comprising:
naming, by the Wi-Fi module, the mobile hotspot with a given name.

15. The method of claim 14, wherein the given name is the same as the temporary device name in the WPAN name field of the first device during the temporary renaming of the first device.

16. The method of claim 9, wherein a WPAN protocol is disabled for the first device prior to processing the network list of WPAN MAC addresses.

17. A method for discovering and connecting to a network, the method comprising:
performing a wireless personal area network (WPAN) discovery process, wherein the discovery process includes:
renaming a first device, by a WPAN module executed on the first device, with a temporary device name in a WPAN name field of the first device;
renaming a second device, by a WPAN module executed on the second device, with the temporary device name in a WPAN name field of the second device;
making, by the WPAN modules executed on the respective first and second devices, the first device and the second device discoverable based on the temporary device name;
performing, by the WPAN modules executed on the respective first and second devices, a WPAN scan for nearby devices that have the same temporary device name;
based on the WPAN scan, finding, by the WPAN modules executed on the respective first and second devices, one or more of the nearby devices with the same temporary device name; and
saving, by the WPAN modules executed on the respective first and second devices, WPAN MAC addresses of the one or more of the nearby devices found with the same temporary device name in a network list; and
performing a Wi-Fi connection process, wherein the connection process includes:
processing the network list of WPAN MAC addresses by each of a plurality of devices having access to the network list;
determining, by each of the plurality of devices, a lowest WPAN MAC address in the network list;
enabling, by a device in the plurality of devices that have the lowest WPAN MAC address, a Wi-Fi infrastructure mode for the device; and
enabling, by all other devices in the plurality of devices, a Wi-Fi client mode for the all other devices; and
connecting to the device enabled in the Wi-Fi infrastructure mode by the all other devices enabled in the Wi-Fi client mode.

18. A device comprising:
a processor configured to cause a wireless personal area network (WPAN) module to:
temporarily rename the device with a temporary device name in a WPAN name field of the device;
make the device discoverable based on the temporary device name;
perform a WPAN scan for nearby devices that have the same temporary device name;
based on the WPAN scan, find one or more of the nearby devices with the same temporary device name;
save MAC addresses of the one or more of the nearby devices found with the same temporary device name; and
change the temporary device name in the WPAN name field of the device to another device name; and
the processor configured to cause a Wi-Fi module to:
connect the device to another device to form a network, the another device being one of the one or more of the nearby devices found with the same temporary device name.

* * * * *